United States Patent [19]
Prikryl et al.

[11] Patent Number: 5,675,413
[45] Date of Patent: Oct. 7, 1997

[54] ADJUSTABLE OPTICAL TEST APPARATUS INCLUDING INTERFEROMETER WITH MICROMIRROR AND ALIGNMENT OBSERVATION SYSTEM

[75] Inventors: Ivan Prikryl; Hollis O'Neal Hall, both of Colorado Springs, Colo.

[73] Assignee: Discovision Associates, Irvine, Calif.

[21] Appl. No.: 710,616

[22] Filed: Sep. 20, 1996

Related U.S. Application Data

[60] Continuation of Ser. No. 474,609, Jun. 7, 1995, abandoned, which is a division of Ser. No. 418,328, Apr. 7, 1995, abandoned.

[51] Int. Cl.[6] ............................................. G01B 9/02
[52] U.S. Cl. .................................... 356/345; 356/363
[58] Field of Search .................................. 356/345, 363

[56] References Cited

U.S. PATENT DOCUMENTS 4,682,025  7/1987  Livingston et al. ................... 356/363

OTHER PUBLICATIONS

Wyko Corporation, Ladite Laser Wavefront Measurement System, no month available 1990, Tuscon, AZ, U.S.A., Page numbers not available.

*Primary Examiner*—Frank G. Font
*Assistant Examiner*—Amanda Merlino
*Attorney, Agent, or Firm*—Ronald J. Clark; Robert T. Braun; Donald Bollella

[57] ABSTRACT

An adjustable optical system for determining aberration in a source beam by comparison of a test beam with a reference beam. The system includes a test source for producing a source beam having a spacial intensity distribution including an aberration component, a wavefront analyzer for processing a fringe signal associated with the aberration component, and an interferometer interposed between the test source and wavefront analyzer. The interferometer includes a beamsplitter for splitting the source beam into a test beam and a reference beam, a mirror disposed in the test beam path, and a micromirror disposed in the reference beam path. The micromirror reflects a central portion of the reference beam toward an imaging device and allows an outer portion of the reference beam to pass thereby. The interferometer is also provided with an alignment image assembly for collecting and detecting the outer portion of the reference beam so that the micromirror and test source may be independently adjusted relative to the central and outer portions of the reference beam.

9 Claims, 3 Drawing Sheets

1

ADJUSTABLE OPTICAL TEST APPARATUS INCLUDING INTERFEROMETER WITH MICROMIRROR AND ALIGNMENT OBSERVATION SYSTEM

CROSS REFERENCE TO RELATED APPLICATIONS

This application is a continuation of U.S. patent application Ser. No. 08/474,609, filed Jun. 7, 1995, which is a divisional of U.S. patent application Ser. No. 08/418,328 filed Apr. 7, 1995, now abandoned.

BACKGROUND OF THE INVENTION

1. Field of the Invention

This invention relates to optical beam test systems, and more specifically to an interferometer having a micromirror for measuring the quality of an optical beam wavefront.

2. Description of the Related Art

Several systems exist for extracting a reference beam from a beam of a source under test. Such reference beams have been found useful in applications such as interferometry. Some systems use a pinhole, i.e. a very small opening, to generate a reference beam from the beam coming from the source to be tested. Generating a reference beam from the original source beam helps to provide a reference beam which has the same wavelength and a constant phase relationship to the original source beam. Frequently, a pinhole is used to provide a reference beam which is relatively free from the effects of aberration present in the source beam. It is well known that when a sufficiently small pinhole is placed in the path of an aberrated beam, a relatively clean beam is produced because most of the energy present due to the aberration is not passed.

In some existing interferometer systems, a beam expander has been used to remove aberration from the beam used as a reference. An existing interferometer system is described in "A Phase Measuring Radial Shear Interferometer for Measuring the Wavefronts of Compact Disc Laser Pickups", B. E. Truax, *Proceedings of SPIE—The International Society for Optical Engineering*, Vol. 661 (1986), 74 ("Truax"). In the system described therein, the interferometer is placed at the output of a laser beam source. A beamsplitter splits the source beam into a test beam and a reference beam. An aperture is used in conjunction with a beam expander to remove aberration from the beam to be used for reference.

Such aperture/beam expander systems generally accept a collimated beam input and produce a collimated output. In such systems, the beam is passed through an aperture to filter out aberration energy which is proportionally greater away from the center of the beam. The resulting filtered beam, now narrower, is then expanded, in order to restore it to the width of the source beam.

As stated, such systems generally accept a collimated beam input. Since the beam is collimated, its energy is not as concentrated in the center as in a focused beam. In a 10% aperture—10X beam expander system, the aperture has one tenth the diameter of the beam. Thus, the area of the aperture is approximately one hundredth of the area of the original beam. When such a 10% aperture system is used as typically with a collimated beam, substantially all of the energy of the beam does not pass the aperture. This great loss in energy places a lower limit on the power level of the sources which can be tested in such systems.

In the system described in Truax, the test beam and the reference beam returning from the beam expander are recombined in the beamsplitter and guided by a set of lenses and a mirror to form an interference pattern on the pickup of a video camera. The interference pattern is analyzed to generate data representing the departure of the source beam from that which produces an ideal wavefront.

A disadvantage of the system described in Truax is that the interferometer must be reconfigured to a different setup from that used for testing in order to check and correct the alignment and placement of the system elements and the source. For example, in the system described in Truax, a mirror is slid into place to block light from striking the video camera from the normal direction used in test. The beam from the source is focused onto the center of a surface where a pinhole lies. A portion of the focused beam is reflected back from the surface and guided through alignment lenses to the sliding mirror where it is reflected into the video camera.

An LED is used to illuminate the pinhole from the reverse direction as occurs during the test. Elements of the system are then adjusted and aligned while the pinhole is illuminated from the rear so that the backlit image of the pinhole overlays the image of the focused spot produced by the source to be tested. When alignment is completed, the sliding mirror is slid out of the path of the beam, and the interferometer is reconfigured to the test setup.

Changing the test setup during the alignment operation has the disadvantages of increased system complexity and the inability to permit the alignment to be checked while the system is configured for testing.

OBJECTS AND SUMMARY OF THE INVENTION

It is, therefore, an object of the present invention to provide an optical filter which provides a first beam relatively free of aberration while simultaneously providing a second beam which can be used for alignment observation purposes.

A further object of this invention is to provide an interferometer which has a micromirror for generating a reference beam which is relatively free of aberration present in the source beam.

Another object of the present invention is to provide an interferometer, the setup of which need not be altered during the alignment operation.

These and other objects of the invention are provided by an interferometer having a micromirror for generating a reference beam which is relatively free from the effects of aberration in a source beam.

The interferometer is used to create and detect an interference pattern for output to an interference pattern analyzer. The interferometer according to the present invention accepts a source beam input from a source under test. The present interferometer is provided with a beamsplitter for splitting the source beam into a test beam and a reference beam. The interferometer has a mirror disposed in the path of the test beam for reflecting the test beam back toward the beamsplitter. This mirror can be movable longitudinally with respect to the test beam for varying the phase of the test beam in relation to the phase of the reference beam.

A micromirror is placed in the path of the reference beam for reflecting a portion of the reference beam back to the beamsplitter. Focusing means, such as a lens, in the path of the reference beam between the beamsplitter and the micromirror is used to focus the reference beam onto the micromirror. The micromirror has a reflector of lateral dimension which does not exceed the approximate lateral dimension of the central lobe of the spatial intensity distribution of the reference beam focused thereon by the focusing means. The lateral dimension of the micromirror is preferably about one third of the lateral dimension of the central lobe of the spatial intensity distribution of the focused reference beam. The interferometer preferably includes an alignment detector positioned behind the micromirror.

The micromirror of the present invention, having a reflective area smaller than the central lobe of the focused reference beam, also serves as a spatial filter for reducing the effects of aberration in a beam.

The filter includes a reflector having a lateral dimension which does not exceed the approximate lateral dimension of the central lobe of the beam focused upon the reflector. The lateral dimension of the reflector preferably does not exceed approximately one third the lateral dimension of the central lobe of the focused beam.

The present invention also provides a method for filtering a beam. The beam is focused upon a reflective-transmissive surface. A central portion of the beam is reflected while another portion lying outside the central portion is transmitted. The central reflected portion does not exceed the approximate lateral dimension of the central lobe of the spatial intensity distribution of the focused beam.

The dimension of the portion reflected is preferably about one third of the lateral dimension of the central lobe of the beam's spatial intensity distribution. It will be appreciated by those skilled in the art that the accuracy and intensity of the reflected beam are influenced by the dimension of the portion selected to be reflected. Selecting a smaller portion for reflection will yield a more accurate, i.e. less aberrated reference beam, while selecting a larger portion for reflection will yield a reference beam of greater intensity.

The micromirror functions as, and provides, a spatial filter which simultaneously provides a reflected beam portion known as a reference beam for interfering with a portion of the unfiltered incoming test beam, and a transmitted beam portion to be received by an alignment observation system.

A method for filtering a beam permits a portion of the filtered beam to be received by an alignment observation system. The method permits the pointing and alignment of a wavefront measurement system, e.g. an interferometer, to be monitored without a change in the configuration of the wavefront measurement system.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing, wherein.

DETAILED DESCRIPTION OF A PREFERRED EMBODIMENT

Figure 1:
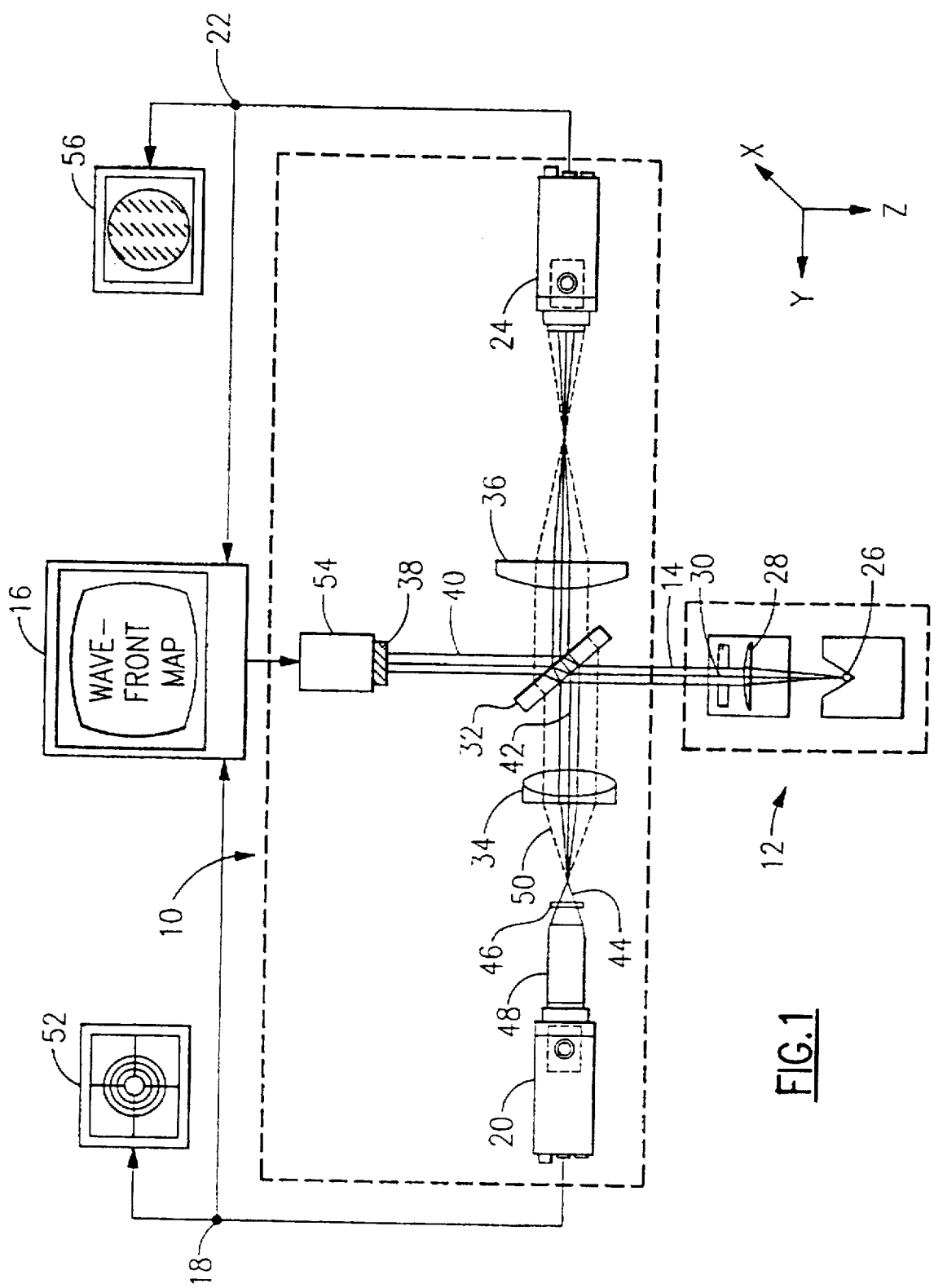
FIG. 1 is a schematic block diagram of an interferometer according to the present invention.

FIG. 1 shows an interferometer 10 for use in taking measurements of a source under test or "SUT" 12. Coupled to the input of the interferometer 10 is a beam 14 from SUT 12. The output of the interferometer 10, as comprised by an alignment signal 18 from an alignment camera 20 and a fringe signal 22 from a fringe camera 24, form the inputs to a wavefront analyzer 16. Within SUT 12 is a point source of radiation 26, a collimator 28, and an exit pupil 30 which forms a beam aperture for establishing the width of the beam exiting the SUT 12.

Within the interferometer 10 is a beamsplitter 32, a reference path lens 34, an image lens 36, a test path mirror 38, a micromirror 44, an appropriate alignment image signal transducer which can be a video camera and which is implemented in the present embodiment as alignment camera 20, and a fringe image signal transducer which can also be a video camera such as the fringe camera 24.

As illustrated in FIG. 1, beamsplitter 32 splits the beam 14 exiting from the SUT 12 into two beams, a test path beam 40 and a reference path beam 42. The test path beam 40 travels from the beamsplitter 32 to the test path mirror 38, whereupon it is reflected back to the beamsplitter 32 and reflected thereby to the fringe camera 24. The reflected test path beam is then focused by the image lens 36 to form an image of the exit pupil 30 on the fringe camera 24. The reference path beam 42 travels away from the beamsplitter 32 and is converged by the reference path lens 34 upon micromirror 44. The distance between the beamsplitter 32 and the test path mirror 38 is preferably chosen to equal the distance between the beamsplitter 32 and the micromirror 44, so that the beams returning from the test path mirror 38 and the micromirror 44 and incident upon the fringe camera 24 are phase stationary with respect to each other, and can form interference fringes for analysis by the wavefront analyzer 16.

The micromirror 44 reflects energy only from the central portion of the focused beam, and allows the remaining energy to pass through a transparent base 46 and an alignment image lens 48 to the alignment camera 20. A portion 50 of the reference beam 42 which is reflected by micromirror 44 is collimated by the reference path lens 34, passed through the beamsplitter 32 and the image path lens 36 which images the exit pupil 30 onto the pickup of the fringe camera 24.

The alignment camera 20, together with the alignment image lens 48, is positioned behind the micromirror 44 and the transparent base 46. Light from the reference path beam 42 which strikes the transparent base 46 but not the micromirror 44 causes an image of the focused spot along with a resulting shadow caused by the micromirror 44 to be cast upon the alignment camera 20.

The alignment signal 18 is output from the alignment camera 20 to a monitor 52 for verification of proper alignment of the micromirror 44. Monitor 52 displays an image of the focused spot and the resulting shadow caused by micromirror 44. An operator viewing the display may adjust the position of the micromirror 44 or other elements including the SUT 12 so as to ensure correct pointing, horizontal alignment, and focusing of the reference path beam 42 upon the micromirror 44. Generally, elements of interferometer 10 are adjusted for some standard conditions, and then the pointing and alignment of the SUT 12 is adjusted. The pointing of the SUT 12 can be adjusted by moving the point source 26 laterally with respect to the collimator 28. It will be appreciated from the foregoing that the source pointing and alignment can be observed and adjusted without any change in the configuration of interferometer 10.

Micromirror 44 can be constructed by any of several known processes, such as selective plating and photolithography on a transparent substrate such as glass. Appendix A is a listing of components, including commercially available items, capable of being used to build the spatial filter and interferometer of the present invention.

The function of the micromirror 44 is to generate a reference beam from the source beam which is relatively free of the effects of aberration in the source beam. The selection of the size of the micromirror is described below with reference to FIG. 2.

Figure 2:
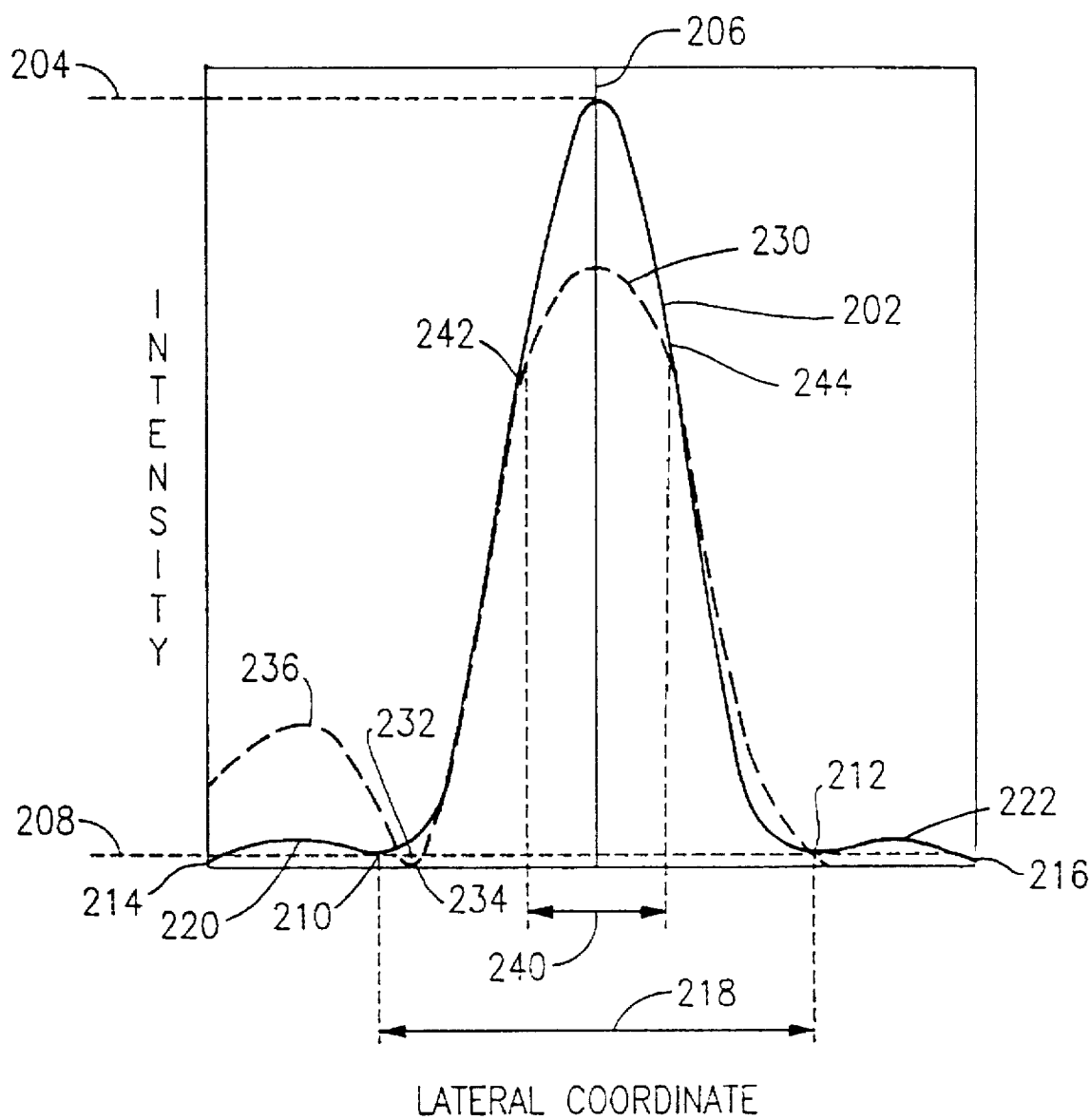
FIG. 2 shows a plot of the spatial intensity distribution for both nonaberrated and aberrated beams.

In FIG. 2, a curve 202 represents the spatial intensity distribution, expressed as intensity versus lateral coordinate, of a focused beam which is free from aberration effects. The nonaberrated beam is pointed and aligned so that a peak intensity 204 occurs at a centerline 206. Minimums of intensity 208 occur at first minimum points 210 and 212, also known as zero order diffraction minima or first nulls. The spatial intensity distribution of the nonaberrated beam 202 also displays second minimum points 214 and 216. These minimum points are also known as first order diffraction minima or second nulls.

The relatively high intensity area between the first minimum points 210 and 212 defines a central lobe of the intensity distribution. The lateral dimension of the central lobe is defined by a distance 218 between first minimum points 210 and 212. Generally, the lateral dimension of the central lobe of the spatial intensity distribution can be estimated mathematically, given such factors as the numerical aperture of the focusing lens and the wavelength used. Alternatively, the lateral dimension 218 of the central lobe can be determined empirically from measurements taken of similar sources and the particular optics used.

Sidelobes 220 and 222 are defined by the area between first minimum points 210, 212 and second minimum points 214, 216 respectively. In a focused nonaberrated beam most of the energy is concentrated in the central lobe as defined by the area under curve 202 between first minimum points 210 and 212. Relatively little energy lies in sidelobes 220 and 222.

Figure 3:
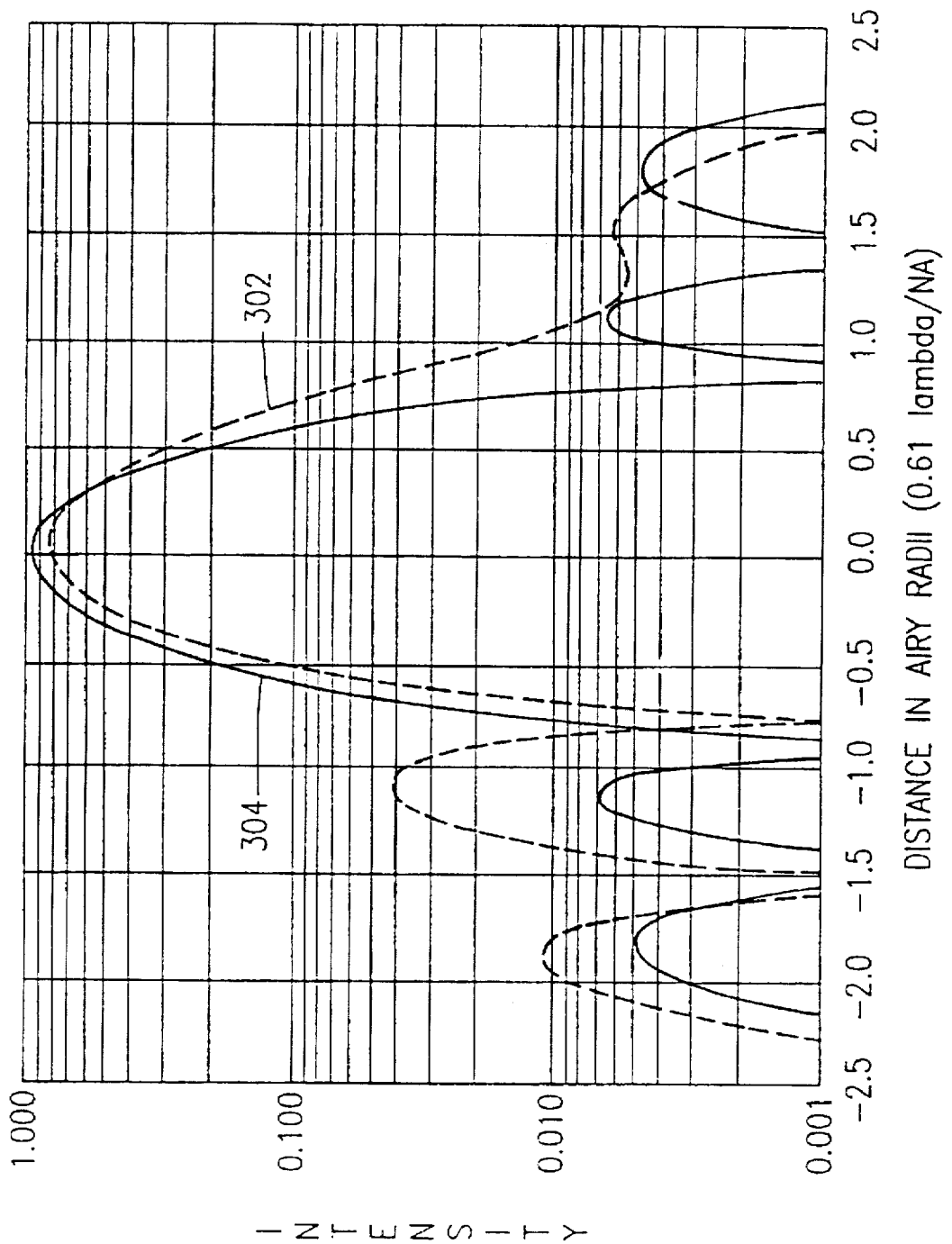
FIG. 3 is a logarithmic representation of the plotted curves illustrated in FIG.

A curve 230 shows the spatial intensity distribution of a focused beam which displays a particular type of aberration known as coma. This type of aberration causes the beam's intensity distribution to become nonsymmetrical such that it is shifted somewhat to one side. On the opposite side, the intensity of a sidelobe 236 remains relatively higher than the intensity of the sidelobe 220 of the nonaberrated beam. Therefore, more energy is present in the sidelobe 236 of the aberrated beam having coma than the sidelobe 220 of the nonaberrated beam. FIG. 3 shows a logarithmic representation of the spatial intensity distribution of both a nonaberrated beam 302 and a beam having coma 304.

The energy contained in the sidelobes of an aberrated beam place an upper limit on the resolution capability of the optical system. If sidelobe energy is too great, the aberrated beam cannot be focused to a sufficient degree to permit the optical system to resolve properly. In the present invention, the micromirror 44 is used as a spatial filter to generate a reference beam which is relatively free from the effects of aberration present in the source beam. The micromirror 44 must be sized to reflect energy contained in the central lobe of the intensity distribution of the source beam, while permitting the sidelobe energy to pass by the micromirror. Therefore, the micromirror 44 should have a reflector which does not exceed the approximate lateral dimension 218 of the central lobe of the focused beam's spatial intensity distribution.

The reflected energy from the micromirror 44 forms a reference beam which is relatively free from aberration. Therefore, the reference beam can be used as a basis for comparison for measuring aberration in the beam from a source under test.

It will be appreciated by skilled practitioners that the portion of the beam selected for reflection plays a role in determining the accuracy and intensity of the reflected reference beam. For application of the micromirror 44 in an interferometer of the present invention, it has been found that the portion of the beam to be reflected should be selected so that the lateral dimension of the micromirror is about one third the diameter of the central lobe of the spatial intensity distribution of the focused beam. This distance is represented by a distance 240 as illustrated in FIG. 2. Distance 240 is also represented by intersection points 242 and 244 between curve 202 the spatial intensity distribution curve 230 of the aberrated beam having coma. This demonstrates that energy present in sidelobe 236 is not reflected when the micromirror is of the smaller preferred dimension 240.

With reference again to FIG. 1, the simultaneous incidence of the test path beam 40 and the reference path beam 42 upon the pickup (not separately marked) of the fringe camera 24 forms an interference pattern which exhibits a number of fringes. Fringe camera 24 detects an image of the fringes and converts such image into the electrical fringe signal 22 for further transmission to a monitor 56 and the wavefront analyzer 16. Monitor 56 displays an image of the fringes. This image can be used to monitor the alignment and pointing of the SUT 12 into the interferometer 10. This arrangement permits an operator to correct residual fine error in the alignment and pointing of the SUT 12 with respect to the interferometer 10. The wavefront analyzer 16 operates upon the fringe signal 22 to map and measure the wavefront quality of the SUT 12 in relation to an idealized wavefront as represented by the reference beam.

Wavefront analyzer 16 can be implemented by any computer such as a PC, and appropriate interfacing devices. The fringe signal 22 from the fringe camera 24 forms the input to a video signal digitizer (not shown) for interfacing into the PC. Any standard video signal digitizer such as the "M Vision 1000 Frame Grabber" available from MU Tech will perform the necessary digitization of the fringe signal 22 for interfacing into the PC. The PC in the wavefront analyzer 16 can then operate upon the digitized image signal to create data representative of the difference between the actual beam wavefront and that of the idealized reference beam.

Wavefront analyzer 16 controls the placement and movement of the test path mirror 38 through a digital analog converter card (not shown) and a piezoelectric translator (PZT) 54. PZT 54 is provided to move the test path mirror 38 in the direction of the propagating wave of the test beam 40 in increments of less than one wavelength so as to vary the phase of the test beam 40 with respect to the reflected reference beam portion 50. In this way, the wavefront from the SUT 12 can be made to interfere with the wavefront of the reflected reference path 50 for several different phases of the beam so as to form a more complete representation of the variations between the two.

The PC of the wavefront analyzer 16 runs software to provide wavefront measurement data for the beam. Appropriate software is provided to generate data representing the variation of the wavefront propagated from the SUT 12 with respect to a wavefront which propagates with perfect planar, spherical or cylindrical geometry. In addition, data representing the variation of the source beam wavefront in terms of mathematical functions known as Zernike polynomials is also produced by operation of the software upon the digitized fringe signal 22.

For example, the measurement data referenced to a planar wavefront indicates the difference of the observed wavefront from the plane equation z=Ax+By+C. The data also indicates the x and y axis tilt; the peak, valley, and peak-valley values; and the residual fit root mean squared (rms) error. The measurement data referenced to a planar wavefront is also provided with the observed variation due to x and y axis tilt subtracted or factored out. In addition, the measurement data referenced to a spherical wavefront also includes a factor for the spherical power of the observed wavefront. The measurement data referenced to a cylindrical wavefront includes a factor for the astigmatism of the observed wavefront.

While this invention has been described in detail with reference to a certain preferred embodiment, it should be appreciated that the present invention is not limited to that precise embodiment. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

APPENDIX A
Micro Mirror Interferometer Parts List:

| | | |
|---|---|---|
| Computer: PC, | 1 | MU Tech, M-Vision 1000 Frame Grabber (for the fringe camera) |
| PCI bus Cards: | 1 | Keithley, DAC-02 Analog output board (05 volt input for PZT high voltage supply) |
| Camera: | 2 | Cohu, 1100 RS-170, 1/2" format |
| PZT | 1 | Polytec PI, P-241.00, 5 micron piezo translator |
| PZT High Voltage Supply | 1 | Polytec PI, P-261.20 OEM amplifier module |
| Optics: | | |
| Test path mirror | 1 | 1" diameter, 3/8" thick, (mounted on the PZT, movement of this mirror is used for phase shift) |
| 50/50 Beam-splitter | 1 | 1.5" diameter, 3/8" thick, (splits 1/2 the light to the test path and 1/2 the light to the reference path) |
| Micro Mirror | 1 | 20 micron chrome dot on a 12.7 mm. diameter glass disk, AR coated. |
| Reference lens | 1 | 200 mm fl lens (used to focus light on the micro mirror) |
| Image lens (Fringe Camera) | 1 | 330 mm fl lens (images the laser source aperture on the fringe camera) |
| Image lens (Alignment Camera) | 1 | 20X microscope objective (images the micro mirror and the focused beam of the reference path, used to align the laser source to the interferometer) |
| Alignment monitor | 1 | Standard B&W camera monitor, (used for real time viewing of alignment camera or fringe camera) |

We claim:

1. An adjustable optical system for determining aberration in a source beam by comparison of a test beam with a reference beam, said optical system comprising:
   a test source for producing a source beam having a spacial intensity distribution including an aberration component;
   a wavefront analyzer for processing a fringe signal associated with said aberration component; and
   an interferometer interposed between said test source and wavefront analyzer, said interferometer including:
   a beamsplitter for splitting said source beam into a test beam traveling on a test beam path and a reference beam traveling on a reference beam path;
   an imaging device for detecting said test beam and said reference beam;
   a mirror disposed in said test beam path, said mirror reflecting said test beam toward said imaging device;
   a micromirror disposed in said reference beam path, said micromirror reflecting a central portion of said reference beam toward said imaging device and allowing an outer portion of said reference beam to pass thereby;
   alignment image means for collecting and detecting said outer portion of said reference beam so that said micromirror may be adjusted relative to said central and outer portions of said reference beam; and
   focusing means disposed in said reference beam path between said beamsplitter and said micromirror for focusing said reference beam on said micromirror, said micromirror having a lateral dimension not exceeding the approximate lateral dimension of a central lobe of said reference beam focused thereon by said focusing means so that when said test beam is reflected by said mirror and said central portion of said reference beam is reflected by said micromirror, said reflected test beam and said reflected portion of said reference beam are both incident upon said imaging device forming an interference pattern thereon, said interference pattern including a plurality of fringes which are converted into said fringe signal by said imaging device.

2. The adjustable optical system according to claim 1 further including a monitor for receiving said fringe signal, said monitor for displaying an image of said interference pattern including said plurality of fringes, said image allowing an operator to monitor the alignment and pointing of said source beam into said interferometer so that corrections to residual fine error may be made.

3. The adjustable optical system according to claim 1 wherein said alignment image means includes a transparent base positioned adjacent said micromirror, an alignment image lens, and an alignment imaging device.

4. The adjustable optical system according to claim 3 wherein said outer portion of said reference beam is focused as a spot onto said alignment imaging device and said micromirror causes a shadow to be cast thereon so that said spot and shadow are thereby detected.

5. The adjustable optical system according to claim 4 wherein said alignment imaging device generates an alignment signal associated with said spot and shadow.

6. The adjustable optical system according to claim 5 further including a monitor for receiving said alignment signal and displaying an image of said spot and shadow so that an operator viewing said image may adjust positioning of said micromirror to correct pointing, horizontal alignment, and focusing of said reference beam relative said micromirror.

7. The adjustable optical system according to claim 5 further including a monitor for receiving said alignment signal and displaying an image of said spot and shadow so that an operator viewing said image may adjust positioning of said test source to correct pointing, horizontal alignment, and focusing of said reference beam relative said micromirror.

8. The adjustable optical system according to claim 1 further including an image lens for focusing said test beam and said reflected beam on said imaging device.

9. The adjustable optical system according to claim 1 wherein said test source includes a collimator for collimating said source beam, the collimated source beam thereafter being directed through an exit pupil provided in said test source.

* * * * *